United States Patent Office 3,658,705
Patented Apr. 25, 1972

3,658,705
STABILIZED POLYAMIDES CONTAINING SOLUBLE COPPER COMPOUNDS AND HALOGENOUS COMPOUNDS
William L. Evers, Summit, and Antony E. Champ, Martinsville, N.J., assignors to Celanese Corporation, New York, N.Y.
No Drawing. Continuation-in-part of application Ser. No. 410,297, Nov. 10, 1964. This application June 12, 1967, Ser. No. 645,475
Int. Cl. C08g 17/60
U.S. Cl. 260—45.75 C
15 Claims

ABSTRACT OF THE DISCLOSURE

Synthetic linear polyamides are stabilized against the degradative effects of heat, oxygen and atmospheric conditions by incorporating therein a halogen compound, for example iodoform, either alone or in combination with a copper compound which is soluble in the polyamides.

CROSS REFERENCES TO RELATED APPLICATIONS

This application is a continuation-in-part of application Ser. No. 410,297, filed Nov. 10, 1964, for Stabilized Polyamides now abandoned.

BACKGROUND OF THE INVENTION

This invention relates to synthetic linear polyamides which are stabilized against degradative effects of heat, oxygen and atmospheric conditions and to the manufacture of said polyamides.

Synthetic linear polyamides when exposed to the atmosphere at elevated temperatures for fairly long periods of time undergo degradation which impairs those physical properties responsible for the toughness, strength, and flexibility characteristics of such substances. In addition, these polyamides are badly discolored by exposure to atmospheric conditions, i.e. high energy radiation, heat and light. The resulting brittleness and discoloration are undesirable to certain applications such as electric insulation, transparent films, fibers, bristles, cloth, coated fabric and the like, wherein much dependence is placed upon maximum retention of toughness, strength, flexibility, original color and light fastness of dyes during fabrication and service.

Numerous stabilizers are known which are said to obviate the embrittlement of the polyamides at elevated temperatures in the presence of oxygen. As examples, satisfactory effects have been obtained by incorporating the molecular copper salts (French Pat. 906,893, British Pat. 652,947); halogenides (German Pat. 5350); certain acids of phosphorus (U.S. Pat. 2,510,777); or mixtures of the substances named above (British Pat. 722,724, U.S. Pat. 2,705,227). It has been further suggested to incorporate organic heat stabilizers in the polyamide molecules, e.g. amines (Dutch Pat. 56,665), mercaptobenzimidazole (U.S. Pat. 2,630,421), or a combination of a copper salt and a hydrohalogenic acid salt of an aryl amine, aliphatic amine and the like (U.S. Pat. 2,960,489).

SUMMARY

It is the object of this invention to provide a high molecular weight synthetic linear polyamide stabilized against degradative effects of heat, oxygen, and atmospheric conditions utilizing a unique class of stabilizers.

It is a further object of the invention to provide a process for stabilizing high molecular weight synthetic linear polyamides against heat degradation or embrittlement that is encountered upon exposure for prolonged periods of time to elevated temperatures, particularly under atmospheric conditions. These and other objects will become apparent to those skilled in the art from the description of the specification and appended claims.

The objects of this invention are accomplished by incorporating into a synthetic linear polyamide, a stabilizer composition comprising a copper compound which is soluble in the polyamides and a stability-enhancing compound of organic iodoform or bromoform compounds having the general formula:

wherein R represents hydrogen or alkyl radicals containing from 1 to 6 carbon atoms and X represents iodine or bromine atoms.

DETAILED DESCRIPTION OF THE INVENTION

The synthetic linear polyamides which are utilized herein are well known in the art and can be prepared from polymerizable mono-aminocarboxylic acids; their amide-forming derivatives, or from suitable diamines and suitable dicarboxylic acids or amide-forming derivatives of these compounds. The polyamides produced have recurring amide groups as an integral part of the main polymer chain and the recurring intra-linear carbonamide groups in these polyamides are separated by hydrocarbon groups containing at least two carbon atoms. Synthetic linear polyamides which can be stabilized according to the process of this invention are all those of the nylon type having an intrinsic viscosity above 0.2, preferably above 0.4. Preparation of such polymers are typically illustrated in U.S. Pats. 2,071,200; 2,071,253; 2,130,948; 2,285,009 and 2,512,606, among others. Particular polyamides included among these which can be stabilized by the stabilizers of this invention include among others, polyhexamethylene adipamide, polyhexamethylene sebacamide, polymerized 6-aminocaproic acid, polytetramethylene sebacamide, polytetramethylene adipamide and polyadipamides prepared from di(4-aminocyclohexyl) ethane or 1,6-(4-aminocyclohexyl) hexane as the diamine component.

The time of addition of the stabilizer compositions to the polyamides is not necessarily critical. The stabilizer compositions as used herein are added preferably to the polyamide salt prior to the condensation reaction which is preferably carried out under known conditions in a pressure vessel, free of oxygen. These stabilizer compositions can be added to the reactants during the condensation reaction and the addition can also be made to the molten polymer after the condensation reaction is complete.

The manner of preparing the polyamides for the condensation reaction is well known in the art. A typical procedure which can be followed for the practice of this invention includes the addition of reactants such as hexamethylene diammonium adipate, and water, in the presence of iodoform and cupric acetate, to a pressure reactor vessel. The reaction solution is heated to approximately 120° C., allowing approximately one-quarter of the water to be distilled from the mixture. The reactor is then closed off and heated until a pressure of from 225–275 pounds per square inch is obtained. The desired pressure, such as 250 p.s.i., is maintained by slight bleeding until the temperature of the mixture reaches approximately 200 to 245° C. When the desired temperature is reached, all of the pressure is released slowly and nitrogen is bubbled through the melt for a sufficient period of time to obtain the desired intrinsic viscosity of the polymer product.

The copper which is employed in the stabilizing composition is present in the polyamide in dissolved form. The phrase "copper in dissolved form" is defined as a copper compound which is dissolved in polyamide, i.e. is distributed uniformly throughout the polyamide. The mechanism whereby copper becomes dissolved in polyamides may vary; for example, by milling metallic copper into a polyamide, a reaction occurs with the polyamide whereby a soluble copper compound is formed. Also, inorganic and organic copper compounds yield complexes with diamines and/or polyamides. The term "copper in dissolved form" embraces these various complexes, no matter how produced.

Representative of the soluble copper compounds which can be utilized in the invention include the cuprous and cupric salts of an organic or inorganic acid and also the copper compounds which are formed when metallic copper and copper oxides are added in quantities to the polyamide or to the polyamide-forming reactants. The preferred compounds are the copper salts of alkanoic acids such as copper acetate, copper propionate, copper butyrate, copper stearate, copper lactate, preferably those alkanoic acids having up to 6 carbon atoms. Other suitable copper compounds include, among others, copper benzoate, cupric chloride, cupric bromide, cupric sulfate, cupric nitrate, ammonium complexes of the above-described salts, etc. The amount of dissolved copper compound, expressed in terms of percent of metallic copper by weight of polyamide, can range from about .0005 to about 0.5 percent, preferably from about .001 to about 0.05 percent.

Another portion of the stabilizer composition can be described as organic iodoform or bromoform compounds having the general formula:

$$R-CX_3$$

wherein R represents hydrogen or alkyl radicals containing from 1 to 6 carbon atoms and X represents iodine or bromine atoms. Suitable compounds falling within this formula include iodoform, methyliodoform, ethyliodoform, propyliodoform, butyliodoform, bromoform, methylbromoform, ethylbromoform, butylbromoform, hexylbromoform, and the like. The amount of organic iodoform or bromoform compound which can be used in the polyamide is used in stabilizing quantities and can range from about 0.05 to about 5 weight percent, preferably 0.10 to 2 weight percent based on the polyamide.

The compositions of this invention may be modified by the addition of other materials. Suitable modifying agents include plasticizers, resins, waxes, fillers and certain pigments. The form and use of the polyamide will determine which of these modifying agents are the more desirable.

The improved polyamides of this invention can be converted into any of the forms suitable for polyamides generally, such as fibers, yarns, tire cord, bristles, fabric, molded articles, films, and coatings, for example, for filaments, textiles, wood, rubber, leather and ceramic materials, and are particularly useful in the above forms when intended to be exposed to elevated temperatures. Thus, they form especially valuable textile fabrics by reason of their stability toward the high temperatures encountered in laundering, calendering, and ironing operations. By reason of their excellent durability, the compositions of the invention are especially useful also for electrical insulation, for example, as coating for magnet wires, electric blasting cap leading wires, and slot insulation for motors, movie film, sausage casing, and as coatings on materials which are exposed to elevated temperatures.

The following examples will serve to illustrate the invention without limiting the same:

EXAMPLE 1

A solution containing 55 grams of hexamethylene diammonium adipate, 0.0078 gram of cupric acetate, and 55 milliliters of water was charged into a small pipe autoclave. To this was added 0.125 gram of iodoform in 5 milliliters of benzene (0.26 percent iodoform, 53 parts per million copper based on final polymer weight). The autoclave was flushed with nitrogen, then heated to about 115° C. 45 milliliters of water (including 5 milliliters of benzene) were removed. The autoclave was then sealed and heated to a temperature of 250° C. and a pressure of about 160 pounds per square inch. The pressure was slowly reduced until atmospheric pressure was obtained. The material was then at 270° C.

Nitrogen was blown over the melt for 15 minutes, than a vacuum of about 15 millimeters was applied for three-quarters hour. At the end of this period, the reactor was closed, pressured to 50 pounds per square inch and the resultant polymer extruded through an appropriate valve in the base of the autoclave. The polymer had a relative viscosity of 2.0.

The polymer thus obtained in the form of wire was exposed at 150° C. in an air oven. This material was flexible after 200 hours exposure, whereas unstabilized polyhexamethylene adipamide became brittle after 65 hours.

EXAMPLES 2-7

The polymerization in Example 1 was carried out in an analogous manner with the differences indicated in the table below.

| | Additive [1] | | Flexibility at 150° C. | | |
|---|---|---|---|---|---|
| Example | Copper, p.p.m. | Iodoform, percent | 72 hrs. | 139 hrs. | 211 hrs. |
| 2 | 50 (cupric acetate) | 0 | Flexible | Partially brittle [2] | Brittle. |
| 3 | do | 0.25 | do | Flexible | Flexible. |
| 4 | 50 (as copper metal) | 0.25 | do | do | Do. |
| 5 | 0 | 0.25 | do | do | Do. |
| 6 | 50 (as cupric hydroxide) | 0.25 | do | do | Do. |
| 7 | 50 (as cuprous oxide) | 0.25 | do | do | Do. |

[1] All weights and percentages are based on the final polymer.
[2] Partially brittle indicates that bending of a number of pieces of this polymer resulted in a high percentage of breaks.

In a similar manner and with similar results as described in Example 1, bromoform is substituted for iodoform. Furthermore, similar results are obtained as well with polyamides such as polyhexamethylene sebacamide, polymerized 6 - aminocaproic acid, polytetramethylene sebacamide and polytetramethylene adipamide stabilized with iodoform, methyliodoform and bromoform.

It is to be understood that the foregoing description is merely illustrative of preferred embodiments of the invention of which many variations may be made by those skilled in the art within the scope of the following claims without departing from the spirit thereof.

What is claimed is:

1. Synthetic linear polyamide said polyamide being derived from the condensation product of a diamine and a dicarboxylic acid having incorporated therein from about 0.0005 to about 0.5 percent by weight of a copper compound from the class cinsisting of metallic copper, oxides of copper, and alkanoic acid salts of copper and from about 0.05 to about 5% of a stability-enhancing compound having the formula:

$$R-CX_3$$

wherein R represents a member of the group consisting of hydrogen and alkyl radicals containing from 1 to 6 carbon atoms and X represents a member of the group consisting of iodine and bromine atoms.

2. Polyamide according to claim 1, wherein the amount of copper compound in said polyamide ranges from about 0.001 to about 0.05% by weight and the amount of the stabilizing-enhancing compound ranges from about 0.10 to about 2 percent by weight.

3. The polyamide of claim 2, wherein the stabilizing-enhancing compound is iodoform.

4. Synthetic linear polyamide said polyamide being derived from the condensation product of a diamine and a dicarboxylic acid having incorporated therein from about 0.05 to about 5% of a stability-enhancing compound having the formula:

wherein R represents a member of the group consisting of hydrogen and alkyl radicals containing from 1 to 6 carbon atoms and X represents a member of the group consisting of iodine and bromine atoms.

5. Synthetic linear polyamide according to claim 4 wherein the amount of the stabilizing-enhancing compound ranges from about 0.10 to about 2% by weight.

6. Synthetic linear polyamide according to claim 5, wherein the stabilizing-enhancing compound is iodoform and the amount thereof based upon the polyamide is about 0.25 percent by weight.

7. A polyamide said polyamide being derived from the condensation product of a diamine and a dicarboxylic acid composition having incorporated therein stabilizing amounts of copper acetate and iodoform.

8. A polyamide said polyamide being derived from the condensation product of a diamine and a dicarboxylic acid composition having incorporated therein stabilizing amounts of (1) an iodine substituted hydrocarbon selected from the group consisting of iodoform and iodo aliphatic compounds having the formula R—CX$_3$ wherein R is an aliphatic radical and (2) copper in dissolved form.

9. The polyamide composition of claim 8, wherein said copper is selected from the group consisting of metallic copper, oxides of copper, and inorganic or organic salts of copper.

10. The polyamide composition of claim 8, wherein the copper in dissolved form is a copper salt of an alkanoic acid.

11. The polyamide composition of claim 8, wherein the copper in dissolved form is a copper halide.

12. The polyamide composition of claim 8, wherein said iodo aliphatic compound is methyliodoform.

13. A stabilizer composition adapted for utilization in stabilizing amounts with a synthetic linear polyamide having recurring intra-linear carbonamide groups as an integral part of the main polymer chain, separated by hydrocarbon groups containing at least two carbon atoms, comprising a copper stabilizer selected from the group consisting of metallic copper, oxides of copper, alkanoic acid salts of copper having from 4 to 18 carbon atoms, copper benzoate, cupric sulfate, cupric nitrate and ammonium complexes of said salts and iodoform.

14. A stabilized composition comprising a synthetic linear polyamide having recurring intra-linear carbonamide groups as an integral part of the main polymer chain, separated by hydrocarbon groups containing at least two carbon atoms and being derived from the condensation product of a diamine and a dicarboxylic acid, and a stabilizing amount of a copper alkanoate and iodoform.

15. The composition of claim 14, wherein said polyamide is polyhexamethylene adipamide.

References Cited
UNITED STATES PATENTS

| | | | |
|---|---|---|---|
| 2,981,715 | 4/1961 | Ben | 260—45.7 |
| 3,189,575 | 6/1965 | Horn et al. | 260—45.75 |
| 3,280,053 | 10/1966 | Twilley et al. | 260—18 |

MAURICE J. WELSH, Primary Examiner

V. P. HOKE, Assistant Examiner

U.S. Cl. X.R.

260—45.7 R